US006214485B1

(12) United States Patent
Barnett et al.

(10) Patent No.: US 6,214,485 B1
(45) Date of Patent: Apr. 10, 2001

(54) DIRECT HYDROCARBON FUEL CELLS

(75) Inventors: Scott A. Barnett; Erica Perry Murray, both of Evanston, IL (US); Tsepin Tsai, White Plains, NY (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/441,104

(22) Filed: Nov. 16, 1999

(51) Int. Cl.[7] ...................................................... H01M 8/00
(52) U.S. Cl. .................. 429/13; 429/30; 429/33; 429/40; 429/41; 429/44; 204/291
(58) Field of Search ................................. 429/11, 13, 30, 429/33, 40, 41, 44; 204/291

(56) References Cited

U.S. PATENT DOCUMENTS 4,894,297 * 1/1990 Singh et al. ............................ 429/40
5,516,597 * 5/1996 Singh et al. ............................ 429/30

* cited by examiner

*Primary Examiner*—Bruce F. Bell
(74) *Attorney, Agent, or Firm*—Reinhart, Boerner, Van Deuren, Norris & Rieselbach, s.c.

(57) ABSTRACT

The direct electrochemical oxidation of hydrocarbons in solid oxide fuel cells, to generate greater power densities at lower temperatures without carbon deposition. The performance obtained is comparable to that of fuel cells used for hydrogen, and is achieved by using novel anode composites at low operating temperatures.

34 Claims, 6 Drawing Sheets

FIG. 5

| Fuel | Anode | 500°C | 550°C | 600°C |
|---|---|---|---|---|
| wet ethane | Ni(10)-YDC | carbon-free conditions | | carbon deposition conditions |
| | Ni(20)-YDC | | | |
| | Ni(40)-YDC | | | |
| dry ethane | Ni(10)-YDC | | | |
| | Ni(40)-YDC | | | |

DIRECT HYDROCARBON FUEL CELLS

FIELD OF THE INVENTION

This invention relates generally to direct use of hydrocarbons in fuel cells and, more particularly, methods, fuel cells and components thereof relating to such use.

BACKGROUND OF INVENTION

Fuel cells are promising electrical power generation technologies, with key advantages including high efficiency and low pollution. Most potential near-term applications of fuel cells require the use of hydrocarbon fuels such as methane, for which a supply infrastructure is currently available. However, fuel cells typically operate only with hydrogen as the fuel. Thus, current demonstration power plants and planned fuel-cell electric vehicles must include a hydrocarbon fuel reformer to convert the hydrocarbon fuel to hydrogen. Fuel cells that could operate directly on hydrocarbon fuels would eliminate the need for a fuel reformer, providing considerable system and economic advantages and presumably improving the viability of the technology.

Prior art fuel cells utilizing hydrocarbon fuels directly have encountered significant problems. For example, direct-methanol polymer electrolyte fuel cells produce relatively low power densities and require prohibitively large Pt loading of the anodes. In addition, methanol can permeate the electrolyte. See, for instance, Ren, X., Wilson, M. S. and Gottesfeld, S. High performance direct methanol polymer electrolyte fuel cells. *J. Electrochem. Soc.*, 143, L12–L14 (1996); and Wang, J., Wasmus. S. and Savinell, R. F. Evaluation of ethanol, 1-propanol, and 2-propanol in a direct oxidation polymer-electrolyte fuel cell a real-time mass spectrometry study. *J. Electrochem. Soc.*, 142, 4218–4224 (1995). Furthermore, only alcohol fuels appear feasible with this approach.

Alternatively, prior art solid oxide fuel cells (SOFCs) can utilize hydrocarbons directly via internal or external reforming. In this approach, a hydrocarbon fuel (e.g., methane) is combined with $H_2O$ and/or $CO_2$, which are typically obtained by recirculating the fuel cell exhaust, and introduced directly to the SOFC anode. Commonly used Ni-based anodes provide the catalyst for the endothermic reforming reactions,

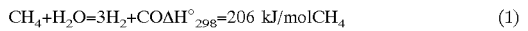  (1)

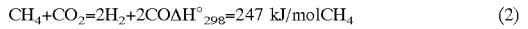  (2)

However, maintaining appropriate gas composition and temperature gradients across a large area SOFC stack is challenging. See, Janssen, G. J. M., DeJong, J. P., and Huijsmans, J. P. P. Internal reforming in state-of-the-art SOFCs. 2nd European Solid Oxide Fuel Cell Forum, 163–172, Ed. by Thorstense, B. (Oslo/Norway, 1996); and Hendriksen, P, V., Model study of internal steam reforming in SOFC stacks. Proc. 5th Int. Symp. on Solid Oxide Fuel Cells, 1319–1325, Ed. by U. Stimming, S. C. Singhal, H. Tagawa, and W. Lehnert (Electrochem, Soc., Pennington, 1997).

For instance, if the reforming reactions are slow, then insufficient $H_2$ is supplied to the SOFCs. On the other hand, fast reforming reactions cause cooling localized near the fuel inlet, leading to poor cell performance, and possible cell fracture. Thus, current SOFC stacks of the prior art do not take full advantage of internal reforming; rather, they employ a combination of ≈75% external and 25% internal reforming of hydrocarbon fuels. See, Ray, E. R. Westinghouse Tubular SOFC Technology, 1992 Fuel Cell Seminar, 415–418 (1992).

SOFCs can in principle operate by direct electrochemical oxidation of a hydrocarbon fuel. This approach would be desirable since it eliminates the problems with internal reforming mentioned above, and the theoretical maximum fuel efficiency is as good or better than that for reforming. However, prior art attempts with SOFCs operating at temperatures $T_c$=900–1000° C. with methane fuel have been less than satisfactory: either power densities were very low or carbon deposition was observed. See, Putna, E. S., Stubenrauch, J., Vohs, J. M. and Gorte, R. J. Ceria-based anodes for the direct oxidation of methane in solid oxide fuel calls, *Langmuir* 11, 4832–4837 (1995); and Aida, T., Abudala, A., Ihara, M., Komiyama, H. and Yamada, K. Direct oxidation of methane on anode of solid oxide fuel cell. Proc. 4th Int. Symp. on Solid Oxide Fuel Cells, 801–809, Ed. by Dokiya, M., Yamamoto, O., Tagawa, H. and Singhal, S. C, (Electrochem. Soc. Pennington, 1995).

Recently, SOFCs have been developed to produce high power densities with hydrogen at reduced temperatures, $T_c$=600–800° C. See, Huebner, W., Anderson, H. U., Reed, D. M., Sehlin, S. R. and Deng, X. Microstructure property relationships of $NiZrO_2$ anodes. Proc. 4th Int. Symp. on Solid Oxide Fuel Cells, 696–705, Ed. by Dokiya, M., Yamamoto, O., Tagawa, H. and Singhal, S. C. (Electrochem. Soc. Pennington, 1995); daSouza, S., Visco, S J. and DeJonghe, L. C. Thin-film solid oxide fuel cell with high performance at low-temperature. *Solid State Ionics* 98, 57–61 (1997); Fung, K-Z., Chen, J., Tanner, C. and Virkar, A. V. Low temperature solid oxide fuel cells with dip-coated YSZ electrolytes. Proc. 4th Int. Symp. on Solid Oxide Fuel Cells, 1018–1027, Ed. by Dokiya, M., Yamamoto, O., Tagawa, H. and Singhal, S. C. (Electrochem. Soc. Pennington, 1995); Minh, N. Q. Development of thin-film solid oxide fuel cells for power generation applications. Proc. 4th Int. Symp. on Solid Oxide Fuel Cells, 138–145, Ed. by Dokiya, M., Yamamoto, O., Tagawa, H. and Singhal, S. C. (Electrochem. Soc. Pennington, 1995); Godickemeier, M., Sasaki, K. and Gauckler, L. J. Current-voltage characteristics of fuel cells with ceria-based electrolytes. Proc. 4th Int. Symp. on Solid Oxide Fuel Cells, 1072–1081, Ed. by Dokiya, M., Yamamoto, O., Tagawa, H. and Singhal, S. C. (Electrochem. Soc. Pennington, 1995); Tsai, T. and Barnett, S. A. Increased solid-oxide fuel cell power density using interfacial ceria layers. *Solid State Ionics* 98, 191–196 (1997); and Tsai, T., Perry, E. and Barnett, S. Low-temperature solid-oxide fuel cells utilizing thin bilayer electrolytes. *J. Electrochem. Soc.*, 144, L130–L132 (1997). However, such systems have not been considered or used for direct-hydrocarbon operation, because carbon deposition reaction rates decrease with decreasing temperature. In fact, there are no known reports SOFC operation on hydrocarbons at $T_c$<800° C.

OBJECTS OF THE INVENTION

There are a considerable number of problems and the deficiencies associated with the use of hydrocarbons with solid oxide fuel cells. There is a demonstrated need for the use of such fuels in an efficient, economical fashion so as to improve the viability of the related technology.

Accordingly, it is an object of the present invention to provide various solid oxide fuel cells and/or components which can be used with hydrocarbon fuels thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all instances, to every aspect of the present invention. As such, the following objects can be used in the alternative with respect to any one aspect of the present invention.

It can be an object of the present invention to increase the rate of hydrocarbon oxidation so as to increase and/or otherwise provide useful power densities. Such densities can be increased and/or provided utilizing various catalytic metals in the fabrication of fuel cell anodes, such anodes as can be used in conjunction with a ceria material.

It can be an object of the present invention to utilize solid oxide fuel cells and/or components thereof for low temperature direct hydrocarbon oxidation.

It can also be an object of the present invention to provide various anodes and related cellular components having small particle size obtainable by sputter deposition processes and/or related fabrication techniques.

It can also be an object of the present invention to provide a method for hydrocarbon oxidation, at a temperature lower than 800° C. and/or at a temperature for a specific hydrocarbon whereby there is no carbon deposition.

Other objects, features, benefits and advantages of the present invention will be apparent from the following summary and descriptions, and will be readily apparent to those skilled in the art made aware of this invention and having knowledge of various and solid oxide fuel cells in the use of hydrocarbon fuels. Such objects, features, benefits and advantages will be apparent from the above as taken in conjunction with the accompanied examples, tables, data and all reasonable inferences to be drawn therefrom.

SUMMARY OF THE INVENTION

The present invention provides for the low-temperature operation of SOFCs using hydrocarbon fuels. High power densities were obtained via direct electrochemical oxidation, without carbon deposition. The results shown herein can be extendable to fuel cell stack operation. In particular and without limitation, the present invention demonstrates the feasibility of direct hydrocarbon electrochemical oxidation in novel low-temperature solid oxide fuel cells. For instance, power densities up to 0.37 W/cm$^2$ were measured for single cells that were operated at 650° C. with atmospheric-pressure air as the oxidant and pure methane as the fuel. The measured power densities are competitive with fuel cells operated on hydrogen. As discussed more fully below, such results can be obtained at low operating temperatures ($T_c$<800° C.) and/or by incorporating ceria in the anodes of such cells.

In part, the present invention is a method of using a solid oxide fuel cell for direct hydrocarbon oxidation. The method includes (1) providing a catalytic metal anode and a ceria material contacting the anode and (2) introducing a hydrocarbon fuel to said cell, said fuel absent carbon dioxide and/or water in an amount sufficient to convert the hydrocarbon fuel to hydrogen under cell operating conditions. As such, the method is absent a hydrocarbon reforming stage.

The anode of the solid oxide fuel cell can be constructed using a metal catalytic for the cracking of hydrocarbons. Such a metal includes but is not limited to Pt, Ru, Pd, Fe, Co and Ni present at weight percentages of the type described elsewhere herein. Various embodiments of the present invention can also include a lanthanum chromite. Various other preferred embodiments, including oxidation of lower molecular weight hydrocarbons, utilize nickel.

In preferred embodiments of the present invention, the ceria material includes a dopant. Such dopants include but are not limited to various oxides of yttrium, gadolinium and samarium. Highly preferred embodiments include a yttria-doped ceria, having the stoichiometric relationship of $(Y_2O_3)_x(CeO_2)_{1-x}$, where "x" can be about 0.1 to about 0.25. One such embodiment is $(Y_2O_3)_{0.15}(CeO_2)_{0.85}$, although other such stoichiometries would be known, to those skilled in the art made aware of this invention, to provide a similar or comparable functional result.

With reference to use of a nickel metal and only by way of example, the catalytic anode can comprise a nickel composite. Such a composite can further include ceria and/or zirconia materials or layers of such materials used in conjunction with the nickel metal. Zirconia can be introduced to such a composite as an electrolyte adjacent to and/or contacting the anode. In preferred zirconia embodiments, various dopants can also be utilized, such dopants including but not limited to calcium, scandium, and yttrium. As would be well-known to those skilled in the art and made aware of this invention, other electrolytes can be used, including ceria, strontium-doped lanthanum gallium magnesium oxide, any of which can be doped as discussed elsewhere herein.

The method of the present invention provides for direct oxidation of hydrocarbon fuels, substantially without any reformation reaction. Fuels especially suitable for use herein include, without limitation, $C_1$–$C_8$ alkanes, and the corresponding alcohols. Likewise, combinations of such hydrocarbons can be utilized with good effect, some mixtures for the purpose of approximating natural gas compositions.

In part, the present invention is also a method of using a ceria material to increase hydrocarbon oxidation rates in a solid oxide fuel cell. The inventive method includes (1) providing a solid oxide fuel cell having an anode composite of a catalytic metal and a ceria layer, (2) operating the cell at a temperature less than about 800° C., (3) introducing a hydrocarbon fuel directly to the anode and (4) sorbing oxygen with the ceria layer for transfer to the anode for hydrocarbon oxidation. Solid oxide fuel cells can be constructed and/or fabricated using methods and techniques well-known to those skilled in the art, together with use of the cell components otherwise as described more fully herein. In preferred embodiments, the hydrocarbon is methane, ethane or a combination thereof, although other fuels can include those previously discussed. Irrespective of the choice of hydrocarbon fuel, preferred embodiments of such a method include operating the cell, together with its anode, at a temperature between about 500° C. and about 700° C.

In part, the present invention is also a method for suppressing and/or eliminating carbon deposition during electrochemical oxidation of a hydrocarbon in a fuel cell. The method includes (1) providing a solid oxide fuel cell anode composite of a catalytic metal and a ceria layer, (2) operating the cell at a temperature less than about 800° C., (3) introducing the hydrocarbon directly to the anode and (4) oxidizing the hydrocarbon at the anode substantially without carbon deposition on the anode. As with other aspects of the present invention, this method can be effected using fuel cells of the prior art and/or as constructed and/or fabricated as elsewhere described herein. In particular, but without limitation, the anode comprises a catalytic metal selected from the group consisting of Pt, Ru, Pd, Fe, Co and Ni. Regardless, preferred embodiments include introducing oxygen electrochemically at the anode at a rate and pressure sufficient to react the oxygen with any elemental carbon present, whereby carbon monoxide disproportionation and/or hydrocarbon pyrolysis are inhibited. While operating pressures less than 800° C. provide the desired effect, such embodiments can be employed beneficially at lower temperatures, typically between about 500° C. and about 700° C., depending on the anode material and/or the hydrocarbon oxidized.

In part, the present invention is also an anode for direct hydrocarbon oxidation in a solid oxide fuel cell. The anode includes (1) a composite having a catalytic metal and a ceria material (2) such that the metal is present in an amount less than 60 weight percent of the anode. Catalytic metals of the present invention include those known to those skilled in the art as useful for the cracking and/or oxidation of hydrocarbons. In preferred embodiments, such a metal can include those of the type described more fully above. Regardless, the ceria material can be used with or without a dopant. In any event, the anode of this invention is substantially without carbon deposits under cell operating conditions. At lower metal levels, the resent invention contemplates use of a current collector as needed to supplement conductivity.

High power density SOFCs and related methods of this invention operate by direct electrochemical hydrocarbon oxidation without carbon deposition. The anodes described herein provide for rapid hydrocarbon electrochemical oxidation rates. The results, confirmed with a simple thermodynamic analysis, show that SOFC stacks can be operated in the temperature range from ≈500 to 700°–800° C. without carbon deposition. Direct oxidation provides a desirable method for utilizing a variety of hydrocarbon fuels, avoiding the difficulties associated with reforming. Indeed, this may be the only feasible approach for low-temperature SOFCs, since extrapolation of internal reforming rate data below 750° C. suggests that reforming rates become prohibitively small.

BRIEF DESCRIPTION OF THE DRAWINGS

FIG. 5 is a table showing conditions that limit and promote carbon deposition, as compared to various Ni-YDC anodes and the parenthetical reference to Ni weight percent therein. While such percentages are shown with respect to ethane and nickel-based anodes, the same can be extented with comparable effect to other anode metals and the direct oxidation of other hydrocarbons, as would be well known to those skilled in the art and made aware of this invention.

EXAMPLES OF THE INVENTION

The following non-limiting examples, data and referenced graphics illustrate various aspects and futures relating to the cell apparatus and methods of this invention, including the surprising and unexpected results showing utility of hydrocarbon fuels at low temperature without carbon deposition. Comparable utilities and advantages can be realized using other embodiments, consistent with this invention. For instance, while numerous examples illustrate this invention through use of methane and ethane, other hydrocarbons including the corresponding alcohols can be used with equal effect through straight-forward modifications of this invention and related fuel cell components, such modifications as would be well known to those skilled in the art and made aware of this invention.

The SOFCs of this invention were fabricated using techniques well-known in the art. In particular, several embodiments were utilized, but comparable results are available using other such electrodes and electrolytes, including those described herein. In preferred embodiments, SOFCs were fabricated on porous $La_{0.8}Sr_{0.2}MnO_3$ (LSM) cathodes. The LSM pellets were ≈2cm in diameter and 1mm thick, and were produced using standard ceramic processing techniques. All SOFC layers, starting with a 0.5 μm-thick $(Y_2O_3)_{0.15}(CeO_2)_{0.85}$ (YDC) porous film, were deposited on the LSM pellet using dc reactive magnetron sputtering. The electrolyte, 8 mol % $Y_2O_3$-stabilized $ZrO_2$ (YSZ), was subsequently deposited under conditions yielding a dense 8 μm thick film. To complete the cell, another 0.5 μm -thick YDC film was deposited, followed by a porous, 2 μm -thick Ni-YSZ anode.

Anode reactions were studied using impedance spectroscopy with anodes that were sputter deposited onto both sides of bulk YSZ single-crystal electrolytes. Data was collected in various fuel environments at the indicated temperatures.

Example 1

Figure 1:
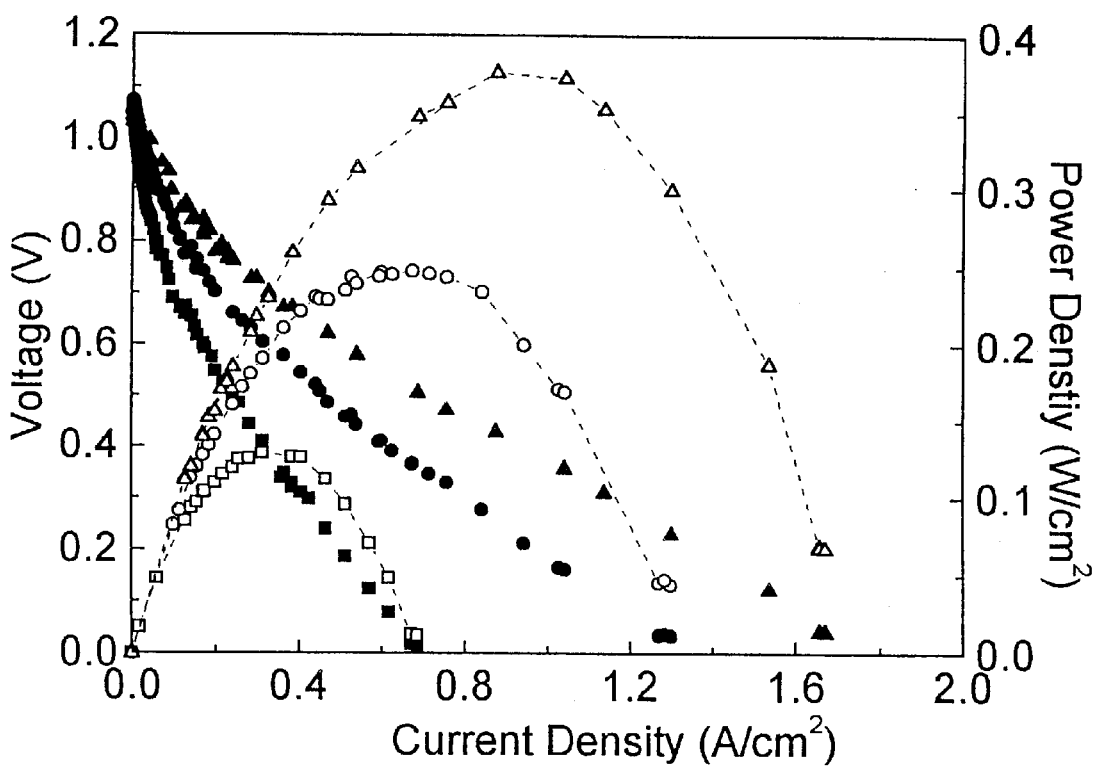
FIG. 1A illustrates cell voltage and power density vs. current density for an SOFC operated on air and methane.
FIG. 1B provides variations in operating temperature for the cell of FIG. 1A and the respective voltage and power densities observed therewith and as shown in FIG. 1A. The measurements were collected in atmospheric pressure air, and methane fuel was supplied at ~50 cm$^3$ STP min$^{-1}$.

Single-cell current-voltage measurements were carried out in air and methane. Identical results were obtained for pure and humidified (containing 3% $H_2O$ ) methane in the early stages of cell tests; while cell performance was stable with dry methane, after ≈2hrs of testing in humidified methane, cell performance degraded because of oxidation of the anode Ni. FIG. 1 shows the measured current density and power density vs. voltage. The open-circuit voltage (OCV) was 1.06V. The current density vs. voltage curves were non-ohmic indicating a substantial electrode overpotential. Based on prior studies of these cells operated on hydrogen fuel, the current densities were limited primarily by cathode, overpotential. Current densities increased with increasing temperature, such that maximum power density increased from 250 mW/cm$^2$ at 600° C. to 370 mW/cm$^2$ at 650° C.

Example 2

By way of comparison, the results of Example 1 were similar to those obtained for cells operated with humidified hydrogen fuel, except that the power densities were ≈20% greater. Visual observation, energy dispersive x-ray (EDX), and scanning electron microscopy (SEM) observations of the anodes, carried out after the call tests, showed no evidence of carbon deposition after ≈100 hrs of operation.

Example 3

Successful cell operation on dry methane (Example 1) indicated that direct electrochemical oxidation, $$CH_4+2O_2=2H_2O+CO_2 \Delta G°(600° C.)=-800 \text{ kJ/mol} \tag{3}$$

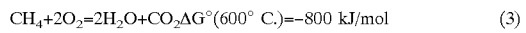

was the primary anode reaction mechanism. The OCV values measured in Example 1, ≈1.06V, were typically very close to the values measured for these cells operated with 97%$H_2$+3%$H_2O$ fuel. This is reasonable given that the $\Delta G°(600°$ C.) values are similar for eqn. 3 and hydrogen oxidation. The exact Nernst potential for eqn. 3 cannot be calculated since the, $H_2O$ and $CO_2$ partial pressures are not known, but the measured $OCV_s$ suggest reasonable values, <0.18 atm for $H_2O$ and <0.09 atm. $CO_2$.

While eqn. 3 shows electrochemical oxidation of methane, it should be noted that the present invention contemplates the possibility of other reaction mechanisms for the desired oxidation products. For instance, various intermediate reactions and/or species can exist enroute to complete oxidation under cell operating conditions. While eqn. 3 illustrates methane oxidation, equations can be provided to portray oxidation of other hydrocarbons discussed herein, likewise accounting for and including the presence of various other intermediate reaction mechanisms and/or species.

Example 4

It is unlikely that hydrocarbon reforming played a role in the cell operation of Example 1, and if so, only after $H_2O$ and $CO_2$ were produced by reaction (3). Discounting such an occurrence, reforming rates were probably too low to contribute significantly to the anode reaction, because of the small anode area ($\approx$1 cm$^2$) and low temperature. Furthermore, the relatively high fuel flow rates used invariably flush any reformation reactants and products from the anode compartment.

Example 5

Figure 2:
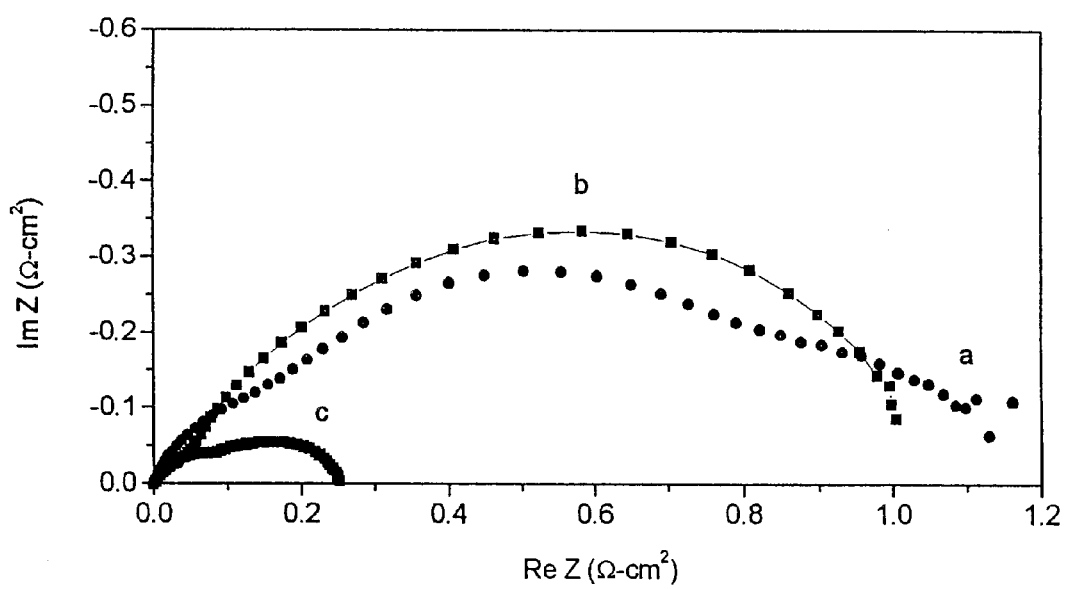
FIG. 2 shows a comparison of electrode impedance spectra for Ni-YSZ/YDC anodes measured at 600° C. in (a) 97% $CH_4$+3% $H_2O$, (b) 3% H2+3% $H_2O$+94%Ar, and (c) 97% $H_2$+3% $H_2O$.

Direct hydrocarbon oxidation is further evidenced by impedance spectra (FIG. 2) obtained from the above-described Ni-YSZ/YDC anodes in humidified methane (a) and humidified dilute $H_2$ (b). An 3%$H_2$+3%$H_2O$+94%Ar mixture, which was used to simulate a slightly reformed methane fuel (b), yielded electrode arcs with a much different shape than those for methane, indicating that the primary anode reaction with methane was not oxidation of hydrogen produced by reforming. Also shown in FIG. 2 is the impedance result for the anode operated in 97%$H_2$+3% $H_2O$ (c). This electrode arc was much smaller than that for methane, indicating a lower anode overpotential and explaining why the SOFC current densities were higher for hydrogen than methane.

Example 6

Figure 3:
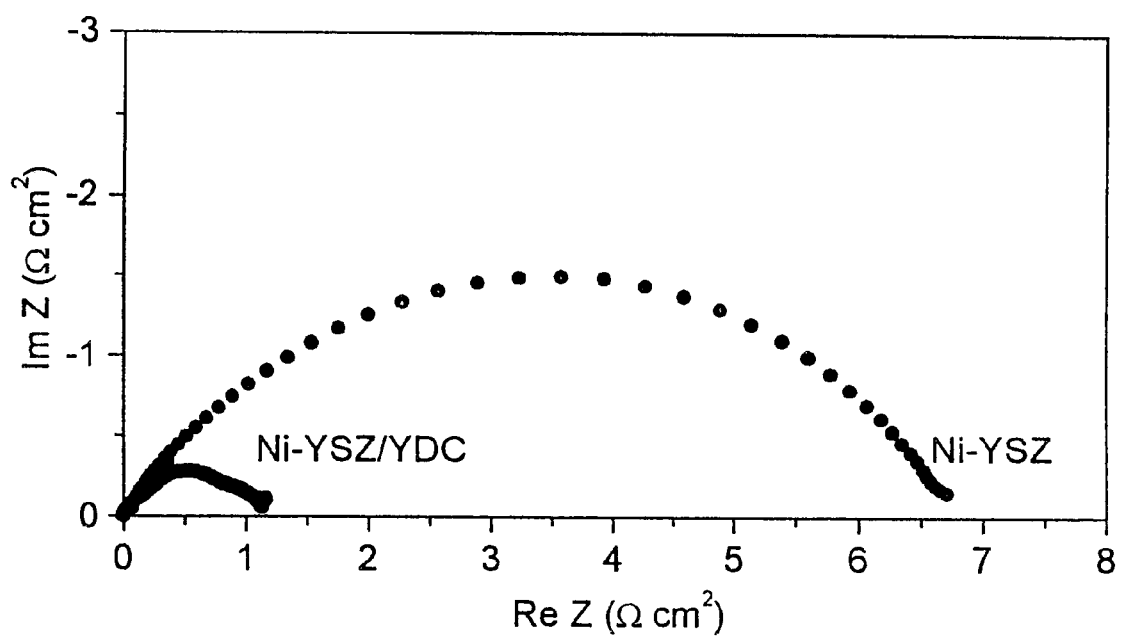
FIG. 3 compares impedance spectroscopy results for Ni-YSZ and Ni-YSZ/YDC anodes in 97% $CH_4$+3%$H_2O$ at 600° C.

It is thought that one factor contributing to the rapid direct electrochemical oxidation of methane at these temperatures is the anodes employed in the SOFCs and, in particular a combination of Ni-YSZ and YDC layers. This is illustrated in FIG. 3, which compares the impedance spectra taken in humidified methane for Ni-YSZ/YDC and Ni-YSZ anodes. The YDC layer causes a factor of $\approx$6 decrease in the electrode resistance. This observation is consistent with prior studies indicating that ceria promotes hydrocarbon oxidation. Without restriction to any one theory or mode of operation, ceria is believed to be beneficial for several reasons. First, it becomes a mixed conductor in a reducing fuel environment, a condition which should expand the reaction zone beyond three-phase boundaries. Second, the ionic conductivity of ceria is higher than that of YSZ, which improves the transport of oxygen ions from the electrolyte to the anodes. Third, ceria is known to readily store and transfer oxygen. The present invention also indicates that the oxygen storage capability of ceria can be enhanced by the addition of zirconia. Preferred embodiments include anodes with two ceria/zirconia interfaces where enhanced oxygen storage can, in this manner, increase methane/hydrocarbon oxidation rates.

Example 7

Another result observed from the cell tests of this invention was the absence of carbon deposition. In general, carbon deposition can occur by methane pyrolysis,

$$CH_4=C+2H_2, \quad (4)$$

or disproportionation,

$$2CO=C+CO_2, \quad (5)$$

On the other hand, the oxygen flux arriving at the anode during SOFC operation tends to react with any carbon, suppressing carbon deposition. The role of methane pyrolysis was tested by flowing pure methane over SOFC anodes, without SOFC operation, such that no reaction products were present. No carbon deposition was observed at <700° C., and the amount of carbon deposited increased only with increasing temperature above 700° C., showing carbon deposition via methane pyrolysis does not occur readily at low temperatures.

Example 8

Figure 4:
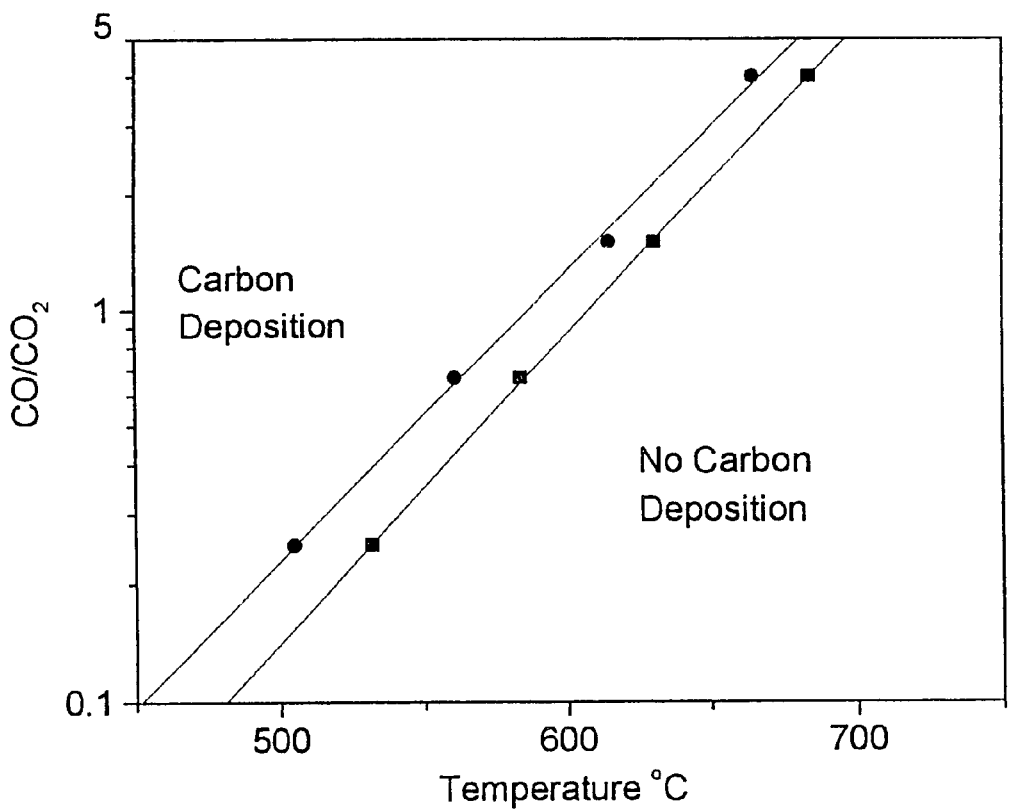
FIG. 4 shows $CO/CO_2$ ratios calculated at equilibrium with graphitic carbon (●$P_{CO}$+$P_{CO2}$, 0.1 atm; and ■$P_{CO}$+$P_{CO2}$, 0.2 atm) based on reaction (5), in Example 7.

During cell operation, product gases are present in the anode compartment, raising, at least, the possibility of carbon deposition via reaction (5). However, as noted above, the present cell tests provide data for nearly pure hydrocarbon in the anode compartment, perhaps due to the small-area cells and relatively high fuel flow rates resulting in small concentrations of reaction products. Even so, consideration was given to the situation encountered in a SOFC stack, where the products of reactions (1)–(3) would be present at substantial partial pressures. Thus, a simple equilibrium calculation was done to determine the conditions where one might expect carbon deposition free stack operation in CO–$CO_2$ mixtures. FIG. 4 shows the CO/$CO_2$ partial pressure ratio at equilibrium with graphitic carbon (eqn. 5) vs. temperature, for two CO+$CO_2$ total pressures. For sufficiently low CO/$CO_2$ ratios, carbon deposition will not occur. The optimal temperature range for SOFC stack operation on dry methane is $\approx$500–700° C. If the temperature is <500° C., carbon deposition proceeds by reaction (5) unless CO/$CO_2$ ratios are very low. While temperatures $\geq$700° C. would tend to suppress carbon deposition by reaction (5), they would allow carbon deposition by direct pyrolysis of methane (eqn. 4).

Example 9

Some internal reforming would be necessary in a SOFC stack to produce a small amount of CO and $H_2$. However, carbon monoxide and hydrogen gas would balance the $CO_2$ and $H_2O$ produced by direct oxidation, preventing exceedingly low CO/$CO_2$ and $H_2$/$H_2O$ ratios where the anode Ni may oxidize.

Example 10

Ethane fuel reactions were studied in SOFC's with anodes of low Ni content. Various cells were made using Ni-YDC anodes containing 10, 20 and 40 weight percent Ni. The porous NI-YDC anodes were $\approx$2 um-thick. The cell structure and processing was similar to that described above, except that the cathode was an LSM-YSZ mixture. In order to identify carbon-free operating conditions, the Ni-YDC anodes were tested in ethane fuel environments at temperatures ranging from 500–700° C.

Ethane oxidation was studied at Ni-YDC anodes using low Ni concentrations intended to limit carbon deposition. FIG. 5 summarizes carbon deposition results at the various Ni-YDC anodes exposed to dry and wet (3% $H_2O$) ethane from 500–600° C. These reaction studies were made without cell operation and indicate the onset of carbon deposition for the given conditions. In wet ethane, anodes with lower Ni content (10–20 wt %) were more resistant to carbon deposition at higher temperatures. For dry ethane fuel, carbon deposition occurred even for low temperatures and anodes with low Ni content. These observations show that carbon-deposition-free cell operation can be conducted using wet ethane with any of the above anode compositions at 500° C., and up to 550° C. for anodes with 10–20 wt % Ni.

Example 11

Figure 6:
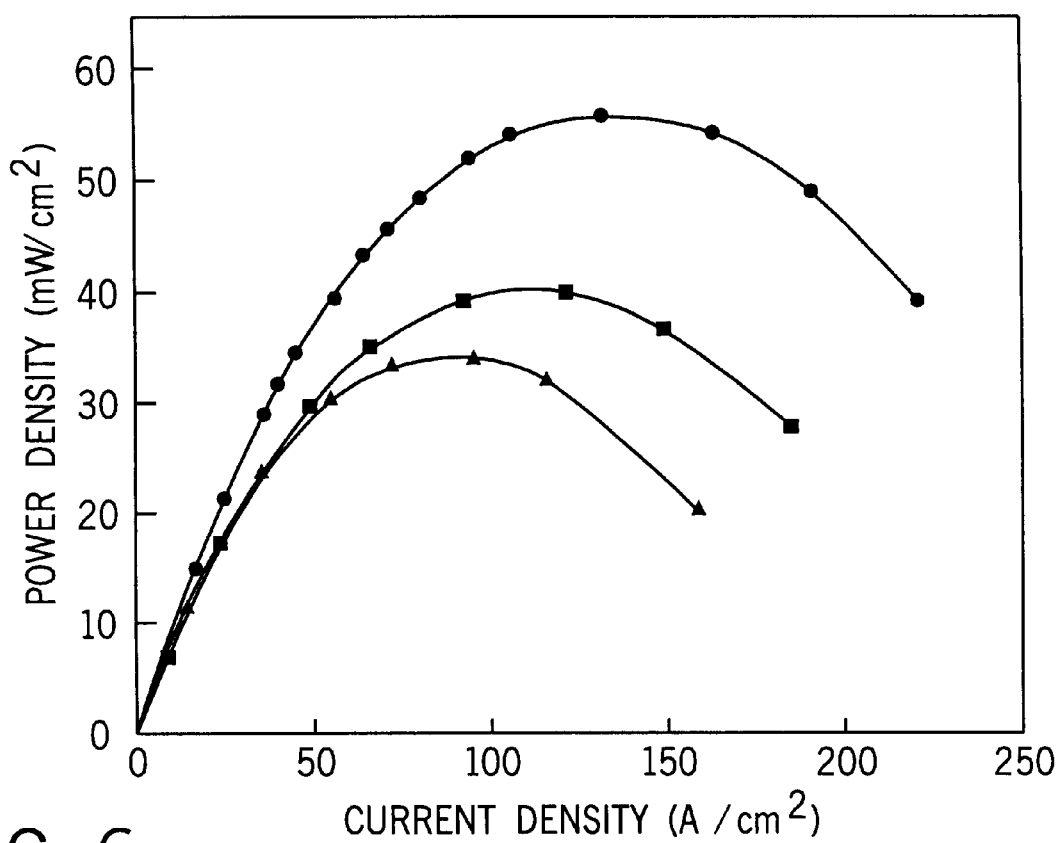
FIG. 6 compares cell power density vs. current density for a solid oxide fuel cell operated on air and ethane.

Current voltage measurements of cells were taken under operating conditions that avoided carbon deposition. The performance of a cell operating with wet (3% $H_2O$) ethane fuel at 500° C. (▲) is illustrated in FIG. 6 and compared to weet hydrogen 92% hydrogen (●) and humidified dilute (94% Ar) hydrogen (■). In this case the Ni-YDC anode contained 40 wt % Ni. The cell current densities were relatively low because of the low temperature. Current densities for ethane fuel were typically about 35% less than for hydrogen fuel. A maximum of ≈35 $mW/cm^2$ was obtained with ethane. No carbon deposition was detected. Carbon-deposition-free cell operation with anodes of lower Ni content (10–20 wt %) was achieved up to 600° C., which is beyond the temperature range indicated by the carbon reaction studies given in FIG. 5. This suggests that the oxygen flux arriving at the anode during cell operation reacted with any carbon, thereby suppressing carbon deposition. However, cell power densities were somewhat low in these cells, either because of low anode electrical conductivity or low Ni catalyst content.

While the principles of this invention have been described in connection with specific embodiments, it should be understood clearly that these descriptions, along with the chosen figures, charts, graphics, and data therein, are made only by way of example and are not intended to limit the scope of this invention, in any manner. For example, the inventive anodes and related cellular components have been shown as utilized with various hydrocarbons; however, as would be well-known to those skilled in the art and made aware of this invention, the methods described herein can also be utilized with various other higher molecular weight hydrocarbon stocks or reaction systems. Likewise, while certain ceria and/or electrolyte materials have been described herein, others can be used alone or in combination and with or without various dopants to achieve the same or similar effect. While various parameters, such as temperature and concentrations, have been described in conjunction with the construction, fabrication and/or operation of various fuel cells and their components, the same parameters can be varied in order to achieve oxidation rates and/or power densities comparable to those described herein. Other advantages and features of this invention will become apparent on the following claims, with the scope thereof determined by the reasonable equivalents, as would be understood by those skilled in the art.

What is claimed is:

1. A method of using a solid oxide fuel cell for direct hydrocarbon oxidation, said method comprising:

providing a catalytic metal anode and a ceria material contacting said anode; and introducing a hydrocarbon fuel to said cell, said fuel absent at least one of sufficient carbon dioxide and water sufficient to convert said hydrocarbon fuel to hydrogen, said method absent a hydrocarbon reforming stage.

2. The method of claim 1 wherein said anode comprises a metal catalyst for the cracking of hydrocarbons.

3. The method of claim 2 wherein said metal is selected from the group consisting of Pt, Ru, Pd, Fe, Co and Ni.

4. The method of claim 1 wherein said ceria material further includes a dopant.

5. The method of claim 4 wherein said ceria material is $(Y_2O_3)_x(CeO_2)_{1-x}$.

6. The method of claim 1 wherein said anode is a nickel composite.

7. The method of claim 6 wherein said composite comprises ceria.

8. The fuel cell of claim 7 wherein said composite further includes zirconia.

9. The method of claim 8 wherein said zirconia is an electrolyte.

10. The method of claim 9 wherein said electrolyte is doped with yttria.

11. The method of claim 1 wherein said cell and said anode are arranged and configured in a stack of said of cells.

12. The method of claim 1 wherein said hydrocarbon is a $C_1$–$C_8$ alkane.

13. The method of claim 1 wherein said hydrocarbon is a $C_1$–$C_8$ alcohol.

14. The method of claim 13 wherein said anode comprises a metal catalyst for cracking hydrocarbons.

15. A method of using ceria to increase hydrocarbon oxidation rates in a solid oxide fuel cell, said method comprising:

providing a solid oxide fuel cell, said cell having an anode comprising a composite of a catalytic metal and a ceria layer;

operating said cell at a temperature less than 800° C.;

introducing a hydrocarbon fuel directly to said anode; and sorbing said oxygen with said ceria layer for transfer to said anode for hydrocarbon oxidation.

16. The method of claim 15 wherein said fuel is a $C_1$–$C_8$ hydrocarbon selected from the group consisting of alkanes, alcohols and combinations thereof.

17. The method of claim 15 wherein said temperature is between about 500° C. and about 700° C.

18. The method of claim 17 wherein said layer is a porous film of $(Y_2O_3)_x(Ceo_2)_{1-x}$.

19. The method of claim 15 wherein said ceria layer further includes a dopant.

20. A method for suppressing carbon deposition during electrochemical oxidation of a hydrocarbon in a fuel cell, said method comprising:

providing a solid oxide fuel cell anode, said anode comprising a composite of a catalytic metal and a ceria layer;

operating said cell at a temperature between about 500° C. and about 800° C.;

introducing said hydrocarbon directly to said anode; and oxidizing said hydrocarbon at said anode substantially without carbon deposition on said anode.

21. The method of claim 20 wherein said hydrocarbon is selected from the group consisting of methane and ethane.

22. The method of claim 20 wherein said anode comprises a metal catalytic for cracking hydrocarbons.

23. The method of claim 22 wherein said metal is selected from the group consisting of Pt, Ru, Pd, Fe, Co and Ni.

24. The method of claim 23 wherein said ceria layer further includes a dopant.

25. The method of claim 24 wherein said layer is $(Y_2O_3)_x (CeO_2)_{1-x}$.

26. The method of claim 20 wherein oxygen is introduced electrochemically at said anode at a rate and pressure sufficient to react with elemental carbon, said reaction inhibiting at least one of carbon monoxide disproportionation and hydrocarbon pyrolysis.

27. An anode for direct hydrocarbon oxidation in a solid oxide fuel cell, said anode comprising:

a composite having a catalytic metal and a ceria material, said metal present in an amount less than 60 weight percent of said anode.

28. The anode of claim 27 wherein said metal is catalytic for the cracking of hydrocarbons.

29. The anode of claim 28 wherein said metal is selected from the group consisting of Pt, Ru, Pd, Fe, Co and Ni.

30. The anode of claim 29 wherein each said metal is present in an amount less than about 40 weight percent.

31. The anode of claim 27 wherein said ceria material further includes a dopant.

32. The method of claim 31 wherein said anode is a nickel composite.

33. The anode of claim 32 wherein said composite further includes a zirconia.

34. The anode of claim 27 substantially without carbon deposits.

* * * * *

UNITED STATES PATENT AND TRADEMARK OFFICE
CERTIFICATE OF CORRECTION

| | |
|---|---|
| PATENT NO. | : 6,214,485 B1 |
| DATED | : April 10, 2001 |
| INVENTOR(S) | : Scott A. Barnett, Erica Perry Murray and Tsepsin Tsai |

It is certified that error appears in the above-identified patent and that said Letters Patent is hereby corrected as shown below:

<u>Column 6,</u>
Lines 45 and 46, "Based on prior studies of these cells" should be -- Based on prior studies of these cells -- (no new paragraph after "of")

<u>Column 8,</u>
Line 48, "$\geqq$" should be -- $\geq$ --;
Line 66, "NI" should be -- Ni --

Signed and Sealed this

Tenth Day of February, 2004

JON W. DUDAS
*Acting Director of the United States Patent and Trademark Office*